United States Patent Office 3,326,982
Patented June 20, 1967

3,326,982
LIQUID POLYTHIOFORMALDEHYDES AND PRODUCTION THEREOF
Pierre Bapsères and Bernard Audouze, Pau, Jean Signouret, Billiere, and Janine Ourgaud, Paris, France, assignors to Societe Nationale des Petroles d'Aquitaine, Paris, France
No Drawing. Filed Mar. 20, 1964, Ser. No. 353,598
Claims priority, application France, Mar. 21, 1963, 928,770
7 Claims. (Cl. 260—609)

The present invention relates to new products formed by liquid polythioformaldehydes, and also to a process for the preparation of these substances.

The products known as polythioformols have been known for a relatively long time, these products actually comprising mixtures and/or combinations of polythioformaldehyde with formaldehyde and water. These products have formed the subject of numerous earlier works, and they have been prepared by the action of hydrogen sulphide on formaldehyde, in accordance with the equation:

$$HCHO + H_2S = CH_2S + H_2O \quad (1)$$

which corresponds in fact to a limited reaction; the water which is formed reacts with the thioformol which is obtained, and produces a partial hydrolysis of the expected compound, thus leading to substances of the general formula:

$$SH-(CH_2S)_n-H-(CH_2O)_m \cdot (H_2O)_p \quad (2)$$

The compounds according to the prior art are mixtures of substances corresponding to the Formula 2, frequently associated with cyclic compounds containing sulphur and oxygen atoms, particularly dithiane and trithiane. They are obtained by the Reaction 1 with a small yield, and their sulphur content does not exceed ⅔ of the theoretical content of the thioformaldehyde. By weight, this content is generally of the order of only 50% or less.

Recently, success has been achieved in approaching the theoretical composition $HS(CH_2S)_nH$, with an average $n$ from 2 to 7, by causing an excess of liquid $H_2S$ to react with a solution of formaldehyde under pressure, but the products obtained still contain a substantial proportion of oxygen and their infrared spectrum presents a strong band characteristic of OH and another of the grouping =C=O. Moreover, on anaylsis, these products show formaldehyde contents of the order of 3% to 4%; they are therefore not strictly polythioformaldehydes of the aforementioned formula. In order to eliminate the oxygen which they contain, it has been proposed to carry out a treatment with non-oxidising aqueous acids under heat, particularly with HCl, which considerably reduces the OH band in the infrared, but leads to products containing a fairly strong proportion of HCHO, for example 4 to 20%, with an appreciable moisture content, and consequently they cannot be considered as true polythioformaldehydes. In addition, the substances according to the prior art generally contain methane-dithiol $$HS-CH_2SH$$

they always have a sulphur content which is not only below 80%, corresponding precisely to this dithiol, but also lower than 69.5%, which would be that of a compound with an infinite number $n$ of $CH_2S$ groups.

The present invention is concerned, on the contrary, with true, well-defined liquid aligo-polythioformaldehydes, of the formula $HS(CH_2S)_nH$, in which the mean value of $n$ can vary between 2 and 8 but particularly from 3 to 4. In practice, the products according to the invention are most frequently formed by compounds, of which each can be represented by the aforementioned formula with another $n$. These polythioformaldehydes contain neither oxygen nor methane-dithiol in practice, and their sulphur content, always higher than 69.5%, is generally between 72% and 76%. The negligible quantity of oxygen which may be found in these new products does not exceed 0.16% (0.3% of HCHO), that is to say, just the proportion of a slight impurity. When an OH band is found in the infrared spectrum of the oligomers according to the invention, it is extremely thin. On the other hand, the moisture content of these products can be very low, particularly below 0.3%.

The main oligomers of thioformaldehyde according to the invention have molecular weights from 170 to 230. One remarkable property of the new products is their liquid state at ambient temperature or at temperatures slightly above 20° C. e.g. ordinary room temperature. In actual fact, the polythioformaldehydes according to the invention are solidified between 0° C. and 20° C.; furthermore, their solidification does not give firm solids, but pasty masses, which are again liquefied on reheating. This physical property, in conjunction with the high purity of these products, makes the industrial uses thereof much more interesting, particularly for the production of resins.

Depending on the sulphur content of the new polythioformaldehydes, and according to the number of $CH_2S$ groups which they contain, the densities at 22° C. generally vary between 1.355 and 1.360, whereas their refractive indices for the yellow sodium ray (D) are: 1.6675 to 1.6700.

The process according to the invention consists in causing formaldehyde to react with hydrogen sulphide in an aqueous solution of these reagents at a temperature which is between 70° C. and 90° C., and preferably as close as possible to 80° C. Although the pressure above the said solution can differ slightly from 1 atm., it is advantageously equal to ambient pressure.

The suitable control of the temperature within the aforementioned limits is of great importance; in fact, the invention results from the unexpected observation that, below 70° C., the reaction of $H_2S$ on formaldehyde leads to waxy and pasty products containing formol, whereas above 90° C., solid polymers are obtained. It is in the region of 80° C. that the purest liquid oligomers are formed, and particularly those with 3 to 4 $CH_2S$-groups.

Another important feature of the new process is the complete saturation of the reaction medium with $H_2S$. Whatever may be the formaldehyde concentration and/or $H_2S$ concentration in the initial solution, this solution must be completely saturated with $H_2S$ during the operation. The injection of the hydrogen sulphide must be continued until a liquid product is obtained, even if a waxy material is transiently formed. In actual fact, if the operation is commenced by bubbling $H_2S$ into a fresh solution of HCHO, there is first of all formed a waxy product containing oxygen at the same time as sulphur; it is a product of same type as the one obtained according to the prior art; however, if instead of collecting this substance, the medium is continued to be saturated according to the invention with $H_2S$, while controlling the temperature so that it does not deviate from the specific range of 70° to 90° C., there are then obtained the new liquid oligomers of thioformaldehyde itself, which no longer contain oxygen, as described above.

It is probable that the reason why it has not been possible so far to prepare these products resides in the quite surprising purpose served by the critical factors which are a condition for this preparation: temperature strictly controlled to 80°±10° C. and saturation with gaseous $H_2S$ at normal pressure, for the period of time necessary for obtaining liquid polythioformaldehyde.

According to one preferred embodiment, the formaldehyde is used in the form of an aqueous solution with a concentration between 1% and 50%, and more particularly 30% to 40%.

The respective periods of saturation vary with the conditions as regards temperature, concentration and supply of $H_2S$. They are generally between 4 and 10 H.

The sulphiding gas is formed by pure $H_2S$ or even by gaseous mixtures with a more or less high content of $H_2S$, and containing gases which do not react with the formol, for example, nitrogen, $CO_2$, etc.

The new liquid compounds which are obtained can easily lead to polymerisation or polycondensation reactions. They constiitute a material with a high sulphur content, which is soluble in conventional solvents and may in particular be advantageously used in the vulcanisation of rubber.

In order to illustrate the invention, a number of non-limitative examples are given below.

*Example 1*

10 litres of commercial formaldehyde with 30% of HCHO are introduced into a reactor equipped with a turbo-stirrer. The reactor is heated to 50° C.; using a descending tube, hydrogen sulphide is continuously injected in such a way as to cause the gas to bubble into the liquid at a rate of 1500 litres per hour. The gas is completely absorbed by the liquid. The temperature rises quickly to 80° C., and it is maintained at this level by suitable cooling of the reactor. After 2 hours, the liquid becomes cloudy and thickens. Vigorous stirring is continued to maintain the temperature at 80° C., and to cause the passage of $H_2S$, although this gas is no longer integrally absorbed. After 4 hours, the rate of flow of $H_2S$ is brought to 1000 litres per hour; it is then necessary to reheat the reaction medium in order to obtain 80° C. After 8 hours, the flow of gas is stopped; the substance is cooled and decanted, this giving two liquid phases. The lower organic layer is separated from the supernatant aqueous phase and it is filtered. There are thus obtained 5 kg. of a very slightly yellowish coloured liquid, which is constituted by polythioformaldehyde, of which the characteristics are as follows:

Contents by weight per cent:

| | Percent |
|---|---|
| SH | 34.7 |
| Total S | 73 |
| C | 22.14 |
| H | 4.99 |
| | 100.13 |
| HCHO | 0.3 |
| $H_2O$ | 0.08 |

Molecular weight 190; density 1.360 at 20° C., refractive index 1.670 at 20° C., summary formula: $HS(CH_2S)_nH$ where $n=3.4$. The product is solidified at +5° C., giving a pasty mass resembling congealed olive oil.

*Example 2*

The operational procedure is analogous to that of Example 1, but the reactor is kept at 85° C. After saturation for 10 hours, a colourless liquid is separated by decantation, the characteristics of said liquid being:

| | Percent |
|---|---|
| Content of SH | 31.30 |
| Total S | 74 |
| C | 22.17 |
| H | 4.61 |

Refractive index 1.6680 at 25° C., Molecular weight 210, Formula: $HS(CH_2S)_nH$, $n=3.85$.

*Example 3*

The operational procedure is analogous to that of Example 1, the reactor being kept at 75° C. After saturation for 7 hours, a colourless liquid is separated by decantation, this liquid having the following characteristics:

| | Percent |
|---|---|
| Content of SH | 32 |
| Total S | 73.10 |
| C | 22.44 |
| H | 5.07 |
| HCHO | 0.20 |
| $H_2O$ | 0.30 |

Refractive index: 1.670 at 20° C. Density: 1.355 at 20° C. Molecular weight: 205. Formula: $HS(CH_2S)_nH$, $n=3.75$. This product is solidified at 10° C.

*Example 4*

6 litres of water are introduced into a reactor equipped with a turbo-stirrer, the reactor is heated to 85° C. and, using a descending tube, hydrogen sulphide is continuously injected thereinto in such a way as to cause the gas to bubble in the water. The rate of flow of gas is 1200 litres per hour. When this water is saturated with $H_2S$, a 30% formaldehyde solution is continuously introduced thereinto at a rate of 2 litres per hour, while maintaining the mixture saturated with hydrogen sulphide by bubbling this gas at the same rate of flow. After 6 hours, the injection of HCHO and hydrogen sulphide is stopped. The mixture is allowed to cool and, by decantation, there are separated 5.4 kg. of a very slightly yellowish coloured liquid, which has the following characteristics:

| | Percent |
|---|---|
| Content of SH | 30.3 |
| Total S | 74 |
| C | 22.04 |
| H | 4.76 |
| | 100.80 |
| HCHO | 0.17 |
| $H_2O$ | 0.20 |

Molecular weight: 220. Formula: $HS(CH_2S)_nH$, $n=4$. The product solidifies at 15° C.

We claim:

1. A process for the production of liquid polythioformaldehydes of the formula $HS(CH_2S)_nH$, in which $n$ is between 2 and 8, comprising saturating and reacting an aqueous solution of formaldehyde with gaseous hydrogen sulphide at a temperature between 70 and 90° C. until the formed reaction product remains liquid after it has been cooled to normal room temperature, the solution being under substantially atmospheric pressure during the reaction.

2. The process of claim 1 wherein the liquid polythioformaldehyde product formed has the formula $$HS(CH_2S)_nH,$$

in which $n$ is in the range of 3 and 4.

3. The process of claim 1 wherein the aqueous solution of formaldehyde initially contains by weight 30 to 40% of formaldehyde.

4. A process for the production of liquid polythioformaldehydes of the formula $HS(CH_2S)_nH$, in which $n$ is between 2 and 8, comprising first saturating water with gaseous hydrogen sulphide and reacting said solution of hydrogen sulphide with an aqueous solution of formaldehyde at a temperature in the range of 70° to 90° C., and treating the reaction mixture with gaseous hydrogen sulphide at said temperature range until the formed reaction produce remains liquid after it has been cooled to normal room temperature, the reaction mixture being under substantially atmospheric pressure during the reaction.

5. The process of claim 4 wherein the liquid polythioformaldehyde product formed has the formula $$HS(CH_2S)_nH$$

in which $n$ is in the range of 3 to 4.

6. As a composition of matter, a liquid product at ordinary room temperature produced by the process of claim 1 containing more than 69.5% and up to 76% by weight of sulphur, said product consisting essentially of polythioformaldehydes of the formula $HS(CH_2S)_nH$ in which $n$ has a value in the range between 2 and 8 and having a negligible oxygen content which does not exceed approximately 0.16% by weight of said product, and a very low moisture content less than 0.3% by weight of said product, said product having a refractive index $n_D^{22°}$ in the range of 1.6675 to 1.6700 and a density at 22° C. in the range 1.355 and 1.360.

7. As a composition of matter, a liquid product at ordinary room temperature produced by the process of claim 1 containing 73 to 74% by weight of sulphur, said product consisting essentially of polythioformaldehydes of the formula $HS(CH_2S)_nH$ in which $n$ has a value in the range of from 3 to 4 and having an oxygen content comprising between 0.09% and 0.16% by weight of said product, and a moisture content not exceeding 0.3% by weight of said product, said product having a refractive index $n_D^{20}$ in the range from 1.6680 to 1.670 and a density at 20° C. in the range 1.355 to 1.360.

References Cited

UNITED STATES PATENTS

| | | | |
|---|---|---|---|
| 1,991,765 | 2/1935 | Marks | 260—79 |
| 3,056,841 | 10/1962 | Saegebarth | 260—609 |
| 3,070,580 | 12/1962 | Harmon | 260—79 |

FOREIGN PATENTS 639,724  4/1962  Canada.

CHARLES B. PARKER, *Primary Examiner.*

DELBERT R. PHILLIPS, M. I. MARQUIS,
*Assistant Examiners.*